(12) United States Patent
Barbulescu

(10) Patent No.: US 6,379,081 B1
(45) Date of Patent: Apr. 30, 2002

(54) TIRES FOR ROLLERS DESIGNED FOR COMPACTING SOIL

(75) Inventor: Bodgan Barbulescu, München (DE)

(73) Assignee: Wacker-Werke GmbH & Co., Inc., Munich (DE)

( * ) Notice: Subject to any disclaimer, the term of this patent is extended or adjusted under 35 U.S.C. 154(b) by 0 days.

(21) Appl. No.: 09/319,082

(22) PCT Filed: Dec. 4, 1997

(86) PCT No.: PCT/EP97/06795

§ 371 Date: May 28, 1999

§ 102(e) Date: May 28, 1999

(87) PCT Pub. No.: WO98/24981

PCT Pub. Date: Jun. 11, 1998

(30) Foreign Application Priority Data

Dec. 5, 1996 (DE) ..................................... 296 21 103 U

(51) Int. Cl.[7] .............................................. E01C 19/23
(52) U.S. Cl. ...................................... 404/124; 404/122
(58) Field of Search ................................ 404/124, 122, 404/117, 121, 129; D12/135, 153; D7/697; 172/518, 537; 31/5.1; 180/71

(56) References Cited

U.S. PATENT DOCUMENTS

| | | | | | |
|---|---|---|---|---|---|
| 740,035 A | * | 9/1903 | Nichols | ..................... | 301/53 |
| 1,043,239 A | * | 11/1912 | Lee | ............................. | 404/124 |
| 1,779,994 A | * | 10/1930 | Tatter | ......................... | 301/41.4 |
| 2,327,057 A | * | 8/1943 | Ofensend | ..................... | 152/209 |
| 2,403,812 A | * | 7/1946 | MacCallum | ................. | 152/209 |
| 3,004,578 A | * | 10/1961 | Braudorn | ..................... | 152/209 |
| 3,717,380 A | * | 2/1973 | Eastwood, II | ............. | 301/41 R |
| 4,422,795 A | * | 12/1983 | Berrange | .................... | 404/124 |
| RE33,312 E | * | 8/1990 | Elliot | ......................... | 404/124 |

FOREIGN PATENT DOCUMENTS

| | | | | | |
|---|---|---|---|---|---|
| DE | 196 48 593 | * | 6/1998 | ........... | E02D/3/026 |
| GB | 441375 | | 2/1936 | | |
| JP | 07215002 | * | 8/1995 | ........... | B60B/15/00 |

OTHER PUBLICATIONS

Who Says Wheels Have to be Round, Machine Design, p. 110, vol. 43 Aug. 1971.

* cited by examiner

Primary Examiner—Thomas B. Will
Assistant Examiner—Kristine Markovich
(74) Attorney, Agent, or Firm—Boyle Fredrickson Newholm Stein & Gratz S.C.

(57) ABSTRACT

A tire for rollers, particularly vibrating rollers, designed for compacting soil, which has a cover made of even sections. The cover sections have the shape of a triangle or trapezium. Adjoining sections each share a side of a triangle or trapezium of the same length and are arranged in such a way that on the face of the tire, running in the direction of its circumference, the point of a triangle of a preceding cover section is followed alternately by the side of the triangle, situated opposite the corresponding point of a triangle, of the adjoining section.

14 Claims, 4 Drawing Sheets

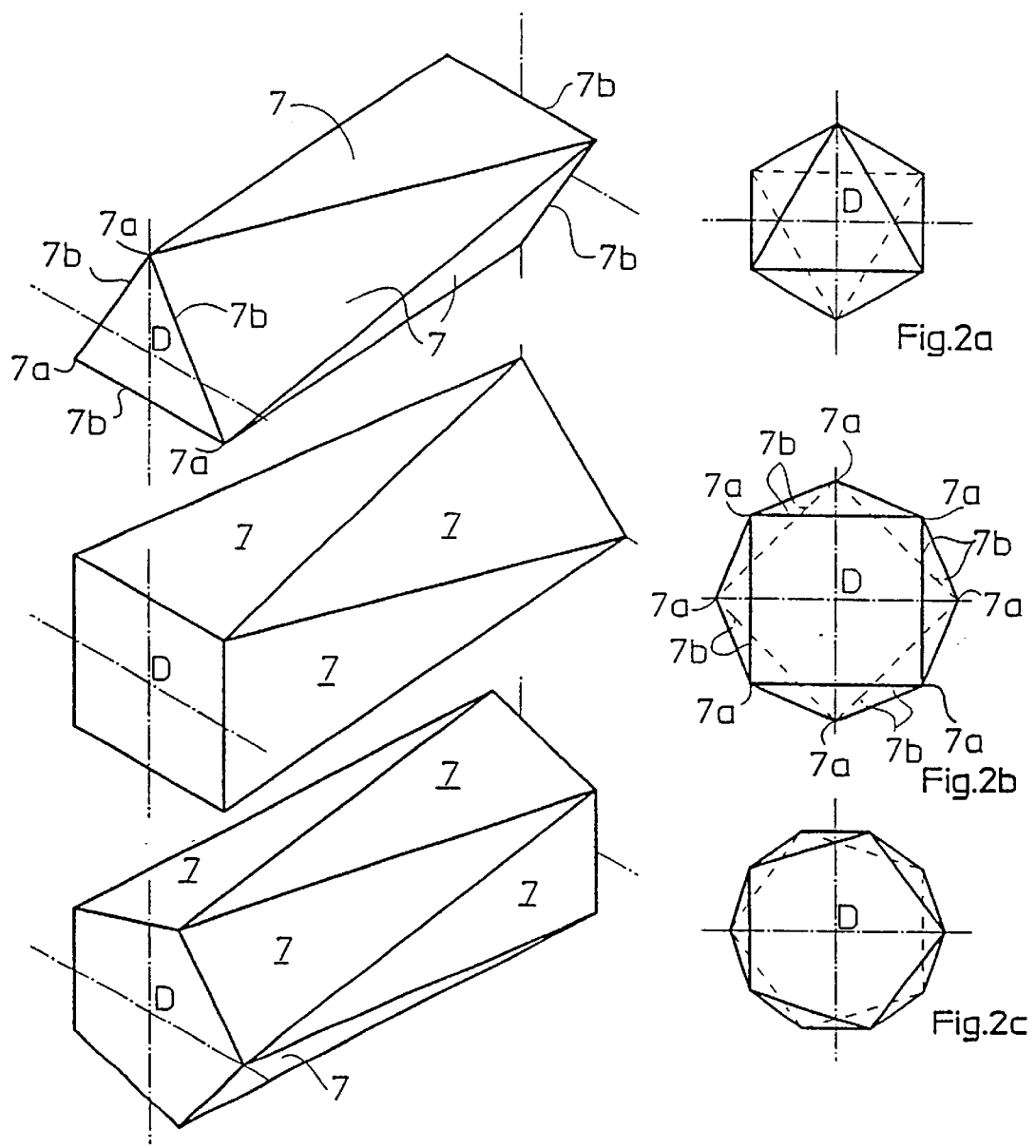

 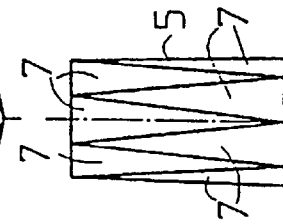 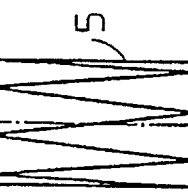 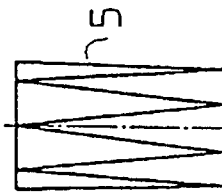
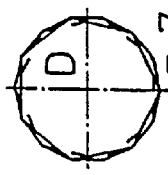 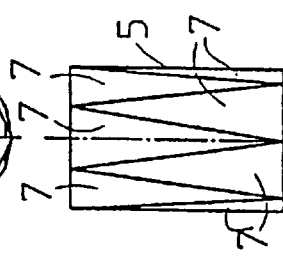 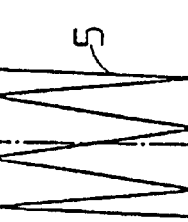 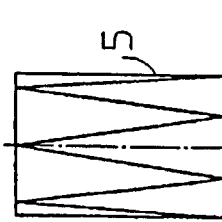
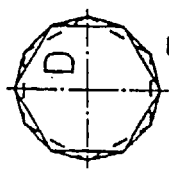 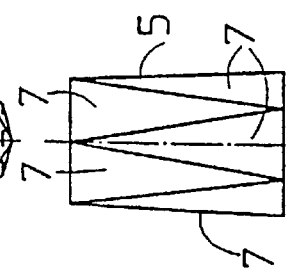 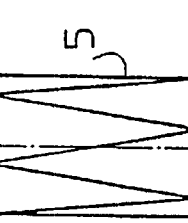 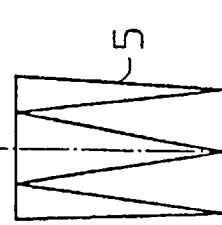
Fig.3a, Fig.3b, Fig.3c

TIRES FOR ROLLERS DESIGNED FOR COMPACTING SOIL

BACKGROUND OF THE INVENTION

1. Field of the Invention

The invention relates to a facing for rollers, in particular vibratory rollers, for the purpose of ground compaction.

2. Description of the Related Art

In comparison with the frequently encountered, known roller facings which have a cylindrical lateral surface and have poor ground traction specifically on upward slopes, but also in the case of unfavorable ground conditions, and tend to slip in these aggravated operating conditions, facings as described herein have the advantage of more reliable traction in these aggravated conditions.

In the case of the known facings of this type, which up until now have only been used for static rollers, the lateral surface is made up of rectangular lateral-surface sections, of which the long side edges extend parallel to the axis of rotation of the facing. Although this form of lateral surface effects the more reliable traction desired, because the bending lines, which extend over the facing width and are located between the planar surface sections, dig into the ground again and again, the increased traction lasts only for the duration of the engagement of such a bending line in the ground, whereas there is an increased risk of slippage when the planar rectangular surface section, which follows an engaging bending line in each case, rests flat on the ground. For this reason, facings which are formed from rectangular surface sections are not suitable either for use in conjunction with a vibratory roller in the case of which the facings are made to vibrate by a vibrator unit which produces a circular vibration or a directed vibration.

The known facings with a lateral surface formed from rectangular planar sections also have the disadvantage of extremely jerky operation, the non-uniformity being all the greater the smaller the number of rectangles used to make up the lateral surface.

In order to improve the traction, the prior art has also proposed to provide the facing surface with grouser bars. Apart from frequently undesirable excessive deformation on the surface of the ground which is to be compacted, grouser-bar facings have the great disadvantage that the material which is to be compacted can clog up between the grouser bars, and the grouser-bar facing is far more difficult to clean than a facing with a surface which is smooth or is made up of planar sections.

Taking the above-mentioned prior art as departure point, the object of the invention is to provide a facing which is also suitable, in particular, for use with vibratory rollers, which is distinguished by traction which is considerably better than that of cylindrical facings, and also than that of the known facings with the lateral surface formed from planar sections, and additionally by rotation which is considerably better than that of the last-mentioned known facings, and which is also very easy to clean.

OBJECTS AND SUMMARY OF THE INVENTION

The above object is achieved by providing a facing for rollers configured to compact ground. The facing includes a lateral surface that is formed from planar lateral-surface sections in the form of a triangle. Adjacent lateral-surface sections each include one triangle side having an equal length in common. The adjacent lateral-surface sections are arranged such that, in an alternating manner in the circumferential direction of the facing, a triangle vertex of a preceding lateral-surface section on the end sides of the facing is followed by a triangle side, located opposite a corresponding triangle vertex, of the following lateral-surface section.

Alternatively, the triangles can have a truncated end to form a trapezium such that the adjacent lateral-surface sections each include one trapezium side having an equal length in common. In this version of the lateral-surface sections, the adjacent lateral-surface sections are arranged such that in an alternating manner in the circumferential direction of the facing, on the end sides of the facing, a shorter trapezium side of a preceding lateral-surface section is followed by a longer trapezium side, located opposite a corresponding shorter trapezium side, of the following lateral-surface section.

The configuration of a facing according to the invention means that during operation of the facing, more or less in any angled position of the latter, at least part of the length of one of its angled bending lines extending over the facing width is in engagement with the ground and thus, even on upward slopes, ensures uninterrupted, essentially slippage-free traction. In comparison with the facings which are made up of rectangular lateral-surface sections, and in the case of which the individual surface-area sections strike the ground one after the other with a jerking movement, the seamless engagement in the ground of the successive facing bending lines between the planar lateral-surface sections also results in considerably more uniform and smooth rotation of the facing, and, in the case of vibrator units being used, the flat lateral-surface sections transmit the vibratory forces into the ground with particularly high efficiency. In this case, the surface-area load is similar to that in the case of vibration plates. Added to this is the fact that the high linear load at the abutment locations between the individual planar lateral-surface sections aids the compaction operation farther.

The planar triangular or trapezoidal lateral-surface sections are preferably shaped identically to one another and are each in the form of an isosceles triangle or trapezoid, in which case they adjoin one another by way of the legs of equal length.

A further preferred embodiment of the facing according to the invention consists in that a plurality of adjoining lateral-surface sections are produced from a common plate by bending the plate for which purpose bending using a laser beam is particularly suitable.

As is customary in the case of compaction rollers, it is also possible in the case of a roller having facings according to the invention for the facing to extend individually over the entire roller width or, in the case of the individual axles, for in each case a plurality of facings to be arranged one beside the other with aligned axes of rotation.

The invention is explained in more detail hereinbelow, with reference to the drawing, using exemplary embodiments.

BRIEF DESCRIPTION OF THE DRAWINGS

In the drawing, in schematic illustrations in each case:

FIGS. 2a to 2c show three facing lateral surfaces made up of different numbers of isosceles triangles, to be precise in isometric illustrations on the left in each case and in front views alongside these to the right;

FIGS. 3a to 3c show three further facing lateral surfaces made up of a different number of isosceles triangles, it being the case that, in the individual figures, the bottom three illustrations located one above the other show the relevant facing in views from above at different angled positions about the axis of rotation of said facing, and the top illustration represents the respective facing as seen from the front.

DESCRIPTION OF THE PREFERRED EMBODIMENTS

Figure 1:
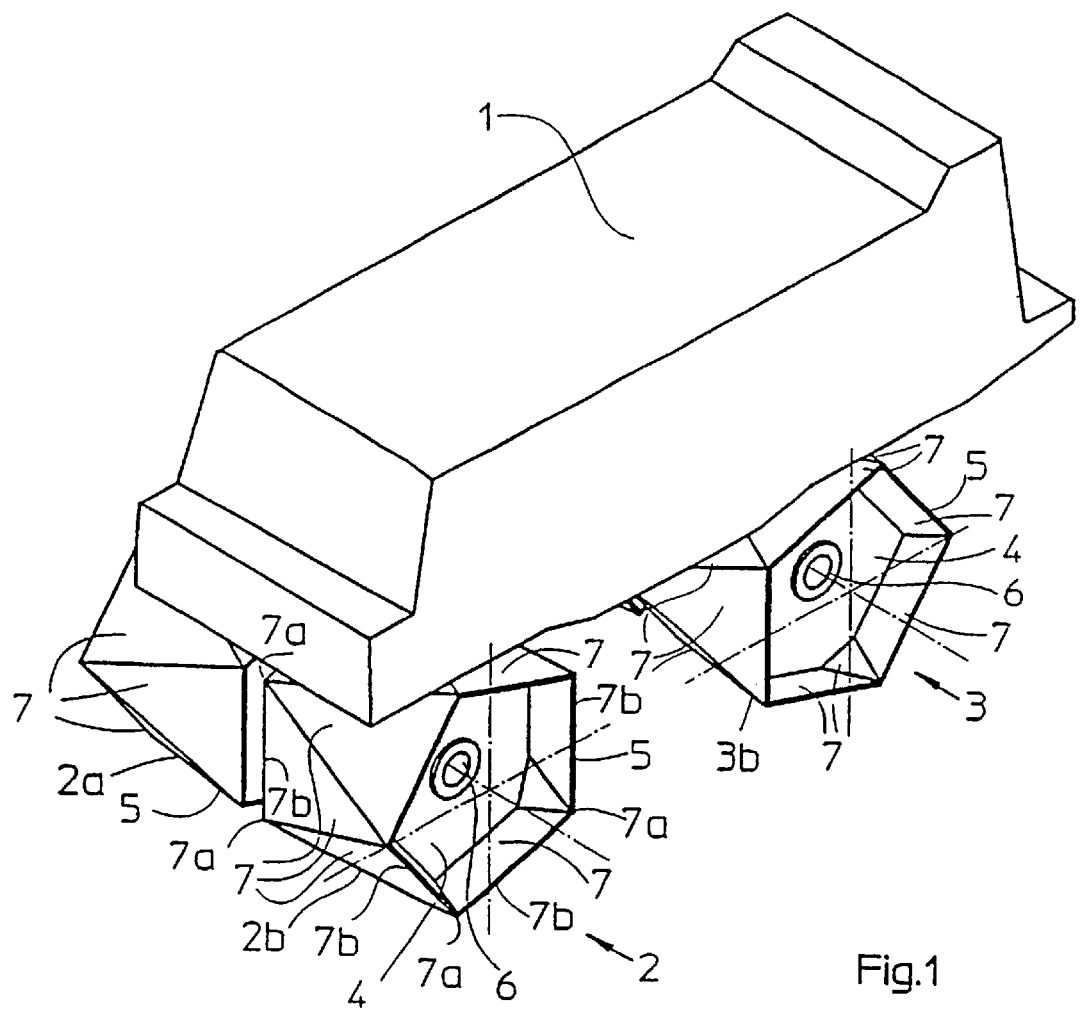
FIG. 1 shows a perspective view of a two-axle ground-compaction roller having in each case two facings according to the invention on each axle.

The roller which is illustrated highly schematically in FIG. 1 has a roller frame 1 in which the customary drive units and control means are accommodated. Beneath the roller frame 1, two pairs of roller facings, each mounted in a floating manner at the roller center, are arranged equiaxially in each case, it being the case that, with at least one of the two axles, the facings are driven in any known manner by the main drive unit in the roller frame 1 and vibratory units may be arranged in a known manner in said facings, it being possible for said vibratory units to make the facings 2a, 2b, 3a (not shown in the drawing) and 3b vibrate. The individual facings 2a, 2b, 3a and 3b each have bearing plates 4 on both sides and a facing lateral surface 5, and, being rotatable about traveling axles 6, they are mounted on the facing carrier (not shown in the drawing) which is located at the roller center and, if appropriate, is steerable.

In the case of the embodiment according to FIG. 1, each facing lateral surface 5 is made up of ten planar lateral-surface sections 7, of which each is in the form of an isosceles triangle, it being the case that mutually adjacent lateral-surface sections 7 have in each case one triangle side of equal length in common. The planar, triangular lateral-surface sections 7 are arranged such that in an alternating manner in the circumferential direction of the facing, on each end side of the latter, a triangle vertex 7a of a preceding lateral-surface section 7 is followed by a triangle side 7b of the following lateral-surface section 7, and each triangle side 7b on one of the end sides of the facing has a triangle vertex 7a on the opposite end side of the facing located centrally opposite it.

FIGS. 2a to 2c each show, in a perspective illustration on the left and in a front view on the right, various possible forms of lateral surfaces, it being the case that according to FIG. 2c corresponds in principle to that used in the case of the facings according to FIG. 1, but is longer than the latter and could be used in the case of a facing which is mounted at both end sides and extends over the entire roller width.

Further possible forms of facing lateral surfaces are illustrated in FIGS. 3a–3c, it being the case that, in the individual figures, one above the other, the facing lateral surfaces 5 are represented in views from above in three angled positions each rotated by the amount of half an edge, and are illustrated in a front view right at the top.

It can be seen from the front views in FIGS. 2a–2c and FIGS. 3a–3c that the distance between the line of symmetry of each surface-area triangle and the axis of rotation D of the facing increases linearly starting from the triangle side 7b on one facing-lateral-surface end side to the corner 7a on the other, opposite facing-lateral-surface end side, with the result that, when the facing rolls on the ground, the bending lines between the surface-area triangles 7 are gradually pressed into the ground, and then removed again, from one end side to the other. This ensures uninterrupted, usually slippage-free, high traction, it being the case that, even when vibrator units are used, the vibratory forces are introduced in optimum fashion into the ground.

Figure 4:
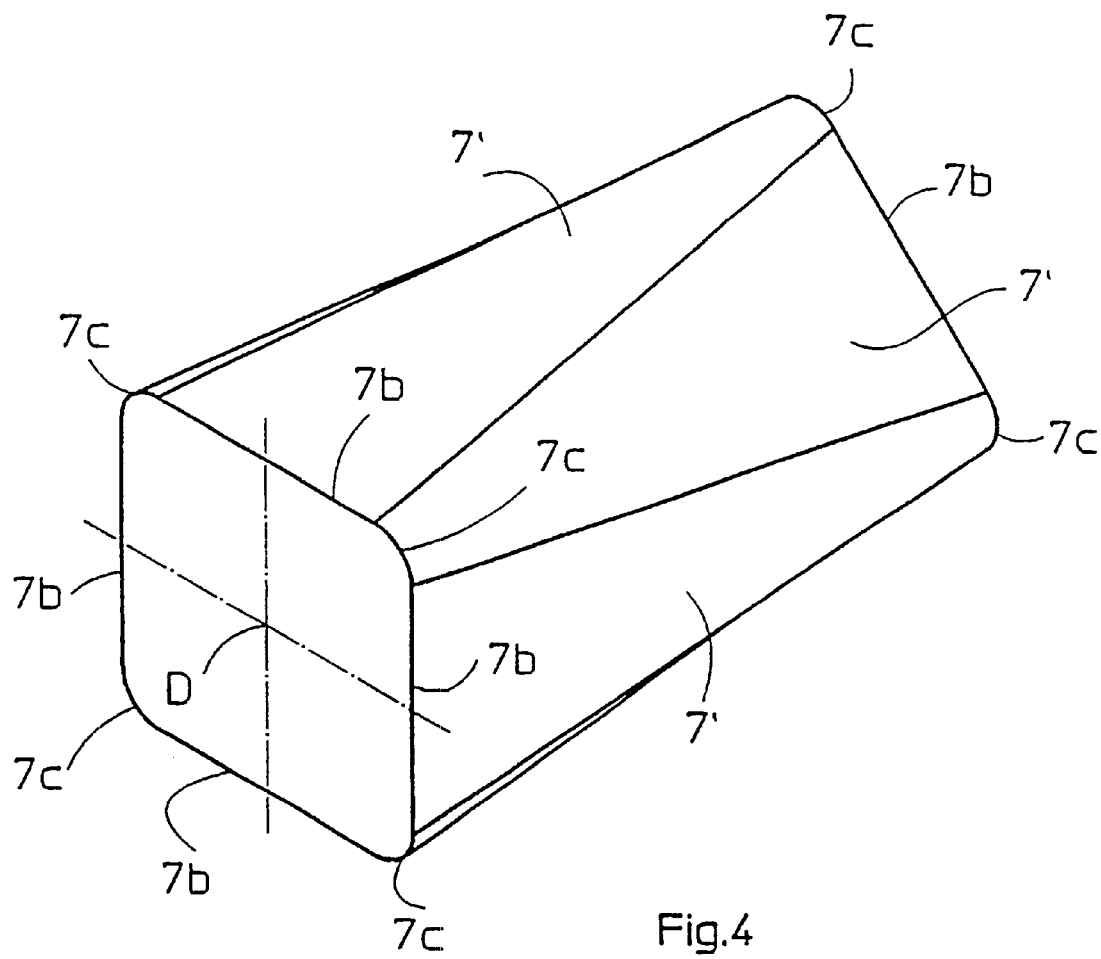
FIG. 4 shows an embodiment of the facing in the case of which the planar lateral-surface sections from which the lateral surface is made up are in the form of isosceles trapezoids.

FIG. 4 shows an embodiment in the case of which the planar lateral-surface section 7' comprise isosceles trapezoids, that is to say, in comparison with the embodiments according to FIGS. 1 to 3c, the corner 7a of the triangle has been cut off in this case, resulting in a short trapezoid side 7c is on the corresponding end side of the facing. This form of facing lateral surface can be produced more easily, be this by bending the lateral-surface material at the bending lines during production of a plurality of surface-area sections 7' from one piece or by welding together individual trapezoidal surface-area sections at the abutting edges.

What is claimed is:

1. A facing for rollers for the purpose of ground compaction, the facing having a lateral surface formed from planar lateral-surface sections, wherein the planar lateral-surface sections are at least generally in the form of triangles, wherein the facing includes opposed first and second ends, wherein each of the planar lateral-surface sections extend from the first end to the second end, wherein two adjacent planar lateral-surface sections have one side in common and are arranged such that, in an alternating manner in the circumferential direction of the facing on each of the opposed first and second ends of the facing, a relatively short portion of a preceding planar lateral-surface section is followed by a relatively long portion of a following planar lateral-surface section that is located opposite a relatively short portion of the following planar lateral-surface section.

2. The facing as claimed in claim 1, wherein the lateral-surface sections which are shaped identically to one another, are each at least generally in the form of an isosceles triangle and adjoin one another by way of triangle legs of equal length.

3. The facing of claim 1, wherein said plurality of lateral-surface sections are produced from a common plate by the plate being bent.

4. The facing of claim 1, wherein each of the lateral-surface sections is in the form of a trapezoid, and wherein the relatively short portions comprise relatively short trapezoid sides that are adjoined by two additional trapezoid sides, and wherein the relatively long portions are formed by relatively long trapezoid sides.

5. A facing for rollers for the purpose of ground compaction, the facing having a lateral surface formed from planar lateral-surface sections, wherein each of the lateral-surface sections is in the form of a triangle, wherein two adjacent lateral-surface sections have one side in common and are arranged such that, in an alternating manner in the circumferential direction of the facing on end sides of the facing, a relatively short portion of a preceding lateral-surface section is followed by a relatively long portion of a following lateral-surface section that is located opposite a relatively short portion of the following lateral-surface section, and wherein the relatively short portions comprise vertices of the triangles.

6. A facing for rollers configured to compact ground, the facing comprising:
a lateral surface that is formed from planar lateral-surface sections that are each at least generally in the form of a triangle,
wherein the facing includes opposed first and second ends, wherein each of the planar lateral-surface sections extend from the first end to the second end, wherein adjacent planar lateral-surface sections each include one side in common, and wherein the planar adjacent lateral-surface sections are arranged such that, in an alternating manner in the circumferential direction of the facing on each of the opposed ends of the facings, a relatively short portion of a preceding planar lateral-surface section is followed by a relatively long portion of a following planar lateral-surface section that is located opposite a corresponding relatively short portion of the following planar lateral-surface section.

7. The facing of claim 6, wherein the rollers comprise vibratory rollers.

8. A facing for rollers configured to compact ground, the facing comprising a lateral surface that is formed from planar lateral-surface sections each in the form of a triangle, wherein adjacent lateral-surface sections each include one side in common, wherein the adjacent lateral-surface sections are arranged such that, in an alternating manner in the circumferential direction of the facing on end sides of the facings, a relatively short portion of a preceding lateral-surface section is followed by a relatively long portion of a following lateral-surface section that is located opposite a corresponding relatively short portion of the following lateral-surface section, and wherein the trianqular lateral-surface sections which are shaped identically to one another, are each in the form of an isosceles triangle and adjoin one another by way of triangle legs of equal length.

9. A facing for rollers configured to compact ground, the facing comprising a lateral surface that is formed from planar lateral-surface sections generally in the form of a triangle, wherein adjacent lateral-surface sections each include one side in common, wherein the adjacent lateral-surface sections are arranged such that, in an alternating manner in the circumferential direction of the facing on end sides of the facings, a relatively short portion of a preceding lateral-surface section is followed by a relatively long portion of a following lateral-surface section that is located opposite a corresponding relatively short portion of the following lateral-surface section, wherein the lateral-surface sections are in the form of trapezoids such that the adjacent lateral-surface sections each include one trapezoid side having an equal length in common, and wherein the adjacent lateral-surface sections are arranged such that, in an alternating manner in the circumferential direction of the facing on the end sides of the facing, a relatively short trapezoid side of a preceding lateral-surface section is followed by a relatively long trapezoid side of a following lateral-surface section that is located opposite a corresponding relatively short trapezoid side of the following lateral-surface section.

10. The facing as claimed in claim 9, wherein the lateral-surface sections which are shaped identically to one another are each in the form of an isosceles trapezoid and adjoin one another by way of trapezoid legs of equal length.

11. A roller configured to compact ground, the roller including a plurality of facings, each facing comprising:

a lateral surface that is formed from planar lateral-surface sections that are each at least generally in the form of a triangle, wherein the facing includes opposed first and second ends, wherein each of the planar lateral-surface sections extend from the first end to the second end, wherein adjacent planar lateral-surface sections each include one side in common, wherein the adjacent planar lateral-surface sections are arranged such that, in an alternating manner in the circumferential direction of the facing on each of the opposed ends of the facing, a relatively short portion of a preceding planar lateral-surface section is followed by a relatively long portion of a following planar lateral-surface section that is located opposite a corresponding relatively short portion of the following planar lateral-surface section, and wherein the plurality of facings are arranged one beside the other with aligned axes of rotation.

12. A roller configured to compact ground, the roller including a plurality of facings, each facing comprising:

a lateral surface that is formed from planar lateral-surface sections that are each in the form of a triangle, wherein adjacent lateral-surface sections each include one side in common, wherein the adjacent lateral-surface sections are arranged such that, in an alternating manner in the circumferential direction of the facing on end sides of the facing, a relatively short portion of a preceding lateral-surface section is followed by a relatively long portion of a following lateral-surface section that is located opposite a corresponding relatively short portion of the following lateral-surface section, wherein the plurality of facings are arranged one beside the other with aligned axes of rotation, and wherein the triangular lateral-surface sections which are shaped identically to one another are each in the form of an isosceles triangle and adjoin one another by way of triangle legs of equal length, and wherein each of the relatively short portions comprise a vertex of the associated triangle.

13. A roller configured to compact ground, the roller including a plurality of facings, each facing comprising:

a lateral surface that is formed from planar lateral-surface sections that are each generally in the form of a triangle, wherein adjacent lateral-surface sections each include one side in common, wherein the adjacent lateral-surface sections are arranged such that, in an alternating manner in the circumferential direction of the facing on end sides of the facing, a relatively short portion of a preceding lateral-surface section is followed by a relatively long portion of a following lateral-surface section that is located opposite a corresponding relatively short portion of the following lateral-surface section, wherein the plurality of facings are arranged one beside the other with aligned axes of rotation, and wherein each of the lateral-surface sections is in the form of a trapezoid having a relatively short trapezoid side, two trapezoid sides adjacent the relatively short trapezoid side, and a relatively long trapezoid side such at the adjacent lateral-surface sections each include one trapezoid side in common, and wherein the adjacent lateral-surface sections are arranged such that, in an alternating manner in the circumferential direction of the facing on the end sides of the facing, a relatively short trapezoid side of a preceding lateral-surface section is followed by a relatively long trapezoid side of a following lateral-surface section that is located opposite a corresponding relatively short trapezoid side of the following lateral-surface section, and wherein the plurality of facings are arranged one beside the other with aligned axes of rotation.

14. The roller of claim 13, wherein the lateral-surface sections which are shaped identically to one another are each in the form of an isosceles trapezoid and adjoin one another by way of legs of equal length.

* * * * *